United States Patent
Tseng et al.

(10) Patent No.: US 8,100,539 B2
(45) Date of Patent: Jan. 24, 2012

(54) 3D IMAGING SYSTEM EMPLOYING ELECTRONICALLY TUNABLE LIQUID CRYSTAL LENS

(75) Inventors: Ling-Yuan Tseng, Saratoga, CA (US); Cheng-Hsing Liao, Hsinchu (TW)

(73) Assignee: Tunable Optix Corporation, Hsinchu Science Park, Hsinchu (TW)

( * ) Notice: Subject to any disclaimer, the term of this patent is extended or adjusted under 35 U.S.C. 154(b) by 958 days.

(21) Appl. No.: 12/100,491

(22) Filed: Apr. 10, 2008

(65) Prior Publication Data
US 2008/0252556 A1     Oct. 16, 2008

Related U.S. Application Data

(60) Provisional application No. 60/910,886, filed on Apr. 10, 2007.

(51) Int. Cl.
G09G 5/00     (2006.01)
H04N 13/04    (2006.01)
G02B 6/00     (2006.01)

(52) U.S. Cl. ............ 353/78; 359/466; 359/458; 349/15; 349/83; 352/47

(58) Field of Classification Search ............... 353/7, 10; 348/50, 51, 53, 52, 42; 352/57, 61, 62; 359/462, 359/466, 475, 477, 478, 479, 458, 666, 665, 359/467; 349/15, 83, 74; 396/324
See application file for complete search history.

(56) References Cited

U.S. PATENT DOCUMENTS

| | | | |
|---|---|---|---|
| 4,712,882 A | 12/1987 | Baba et al. | |
| 4,783,153 A | 11/1988 | Kushibiki et al. | |
| 4,783,155 A | 11/1988 | Imataki et al. | |
| 4,892,396 A | 1/1990 | Kushibiki et al. | |
| 5,113,272 A * | 5/1992 | Reamey | 349/78 |
| 5,138,494 A | 8/1992 | Kurtin | |
| 5,526,067 A | 6/1996 | Cronin et al. | |
| 5,684,637 A | 11/1997 | Floyd | |
| 5,745,197 A * | 4/1998 | Leung et al. | 349/77 |
| 5,813,742 A * | 9/1998 | Gold et al. | 353/88 |
| 5,999,328 A | 12/1999 | Kurtin et al. | |
| 6,040,947 A | 3/2000 | Kurtin et al. | |
| 6,369,954 B1 | 4/2002 | Berge et al. | |
| 6,493,151 B2 | 12/2002 | Schachar | |

(Continued)

FOREIGN PATENT DOCUMENTS

EP     1 333 687 A1     8/2003

(Continued)

*Primary Examiner* — William C Dowling
(74) *Attorney, Agent, or Firm* — Winston Hsu; Scott Margo

(57) ABSTRACT

A system for photographing an object and generating a three-dimensional display of the object without the need for the observer to wear special glasses employs a camera having an electronically tunable liquid crystal lens in which the focal plane of the lens may be adjusted by controlling the voltage on the lens. An operator of the camera focuses the camera on the scene to be imaged and the camera records a series of images at closely spaced focal lengths by varying the voltage applied to the lens between the images. The digitally recorded images are then used to generate a display on a multilayer transparent display substrate with pixel addressing capabilities. Each of the recorded images at the differing focal lengths are displayed on one of the layers of the display screen, with the closest focal length recorded being displayed on the top screen, the one most proximate to the observer, and with successive images on other screens. A three-dimensional image is produced.

6 Claims, 8 Drawing Sheets

U.S. PATENT DOCUMENTS

| | | | |
|---|---|---|---|
| 6,593,994 B2 * | 7/2003 | Son et al. | 352/65 |
| 6,683,725 B2 * | 1/2004 | Wohlstadter | 359/626 |
| 6,715,876 B2 | 4/2004 | Floyd | |
| 6,721,023 B1 * | 4/2004 | Weiss et al. | 349/87 |
| 6,806,849 B2 * | 10/2004 | Sullivan | 345/6 |
| 7,046,447 B2 * | 5/2006 | Raber | 359/625 |
| 7,142,369 B2 | 11/2006 | Wu et al. | |
| 7,148,859 B2 * | 12/2006 | Suyama et al. | 345/6 |
| 7,537,345 B2 * | 5/2009 | Refai et al. | 353/7 |
| 7,587,120 B2 * | 9/2009 | Koo et al. | 385/147 |
| 7,614,748 B2 * | 11/2009 | Nayar et al. | 353/7 |
| 7,724,347 B2 * | 5/2010 | Tseng et al. | 349/200 |
| 7,736,004 B2 * | 6/2010 | Hong et al. | 353/7 |
| 7,742,232 B2 * | 6/2010 | Cho et al. | 359/619 |
| 7,951,001 B2 * | 5/2011 | Wells | 463/33 |
| 2006/0232583 A1 | 10/2006 | Petrov | |
| 2010/0194865 A1 * | 8/2010 | Kusada | 348/52 |

FOREIGN PATENT DOCUMENTS

| | | |
|---|---|---|
| GB | 2 354 391 A | 3/2001 |
| JP | 2000322602 | 11/2000 |

* cited by examiner $t_1$ → displaying the far distance image, captured at f(n)

$t_2$ → displaying the images, swing between f(2) to f(n-1)

$t_3$ → displaying the near end image, captured at f(1)

3D IMAGING SYSTEM EMPLOYING ELECTRONICALLY TUNABLE LIQUID CRYSTAL LENS

CROSS-REFERENCE TO RELATED APPLICATIONS

This application claims priority of U.S. Provisional Patent Application Ser. No. 60/910,886 filed Apr. 10, 2007, which is incorporated herein by reference.

FIELD OF THE INVENTION

This invention relate to a method and apparatus for recording an image of an object or scene and then displaying the image so as to produce an apparent three-dimensional image of the object or scene without requiring the observer to wear special glasses and more particularly to such a system which involves recordation on an electronically tunable liquid crystal lens camera so as to record a series of images of the object or scene at multiple focal lengths.

BACKGROUND OF THE INVENTION

A variety of systems have been proposed for recording and reproducing images of an object or scene so that the reproduction appears to have three dimensions. Systems which holographically record and display images can reproduce very accurately the three-dimensional appearance of the recorded scene or object, but are difficult to implement and only work under certain ideal conditions. Most systems proposed have employed a stereoptic effect by recording two images of an object from displaced cameras, and displaying both images in such a manner that an observer wearing special glasses sees one image from one eye and the other image from the other eye. These systems often fatigue the eyes and cannot be tolerated by many people.

SUMMARY OF THE INVENTION

The present invention is accordingly directed toward a system for recording images of an object or scene with a single lens and displaying the recorded image in such a way as to produce a three-dimensional effect.

The invention makes use of a camera having an electronically tunable liquid crystal lens, in which the focal plane of the camera lens can be electronically adjustable. The camera is equipped with the conventional controls found on variable focus cameras which allow the user to frame and adjust the focal length to record an image of a desired object or portion of a scene. A microprocessor-based controller then takes a series of images of the targeted area at closely spaced focal lengths, shifting the focal plane by small increments from either the front of the object to the back or vice versa. With present technology these images can be formed very rapidly so that numerous focal plane images of the object can be captured in a fraction of a second, so that the camera or scene motion does not affect the quality of the picture.

The images are then displayed on a multilayered display screen of the transmissive type, for example TFT-LCD. The backlight comes from the rear of the display panel and is transmitted through all the display layers. Each display panel is pixel selective and a microprocessor-based system controls the illumination of each pixel based on the recorded image at the focal length associated with the display layer. The top display layer, the one closest to the observer, will display the shortest focal length image of the set and successive display panels will be controlled by selectively longer images. There must be at least two display screens in the stack in order to produce a three-dimensional image, although a larger number is preferable and produces a higher resolution image.

BRIEF DESCRIPTION OF THE DRAWINGS

Other objects, advantages and applications of the present invention will be made apparent by the following detailed description of a preferred embodiment. The description makes reference to the accompanying drawings in which.

DETAILED DESCRIPTION OF A PREFERRED EMBODIMENT this invention is to capture the image of an object by dividing it into many image frames. Each frame is captured at a different distance with different focal length, or the so-called "focal depth map" (FDM).

Figure 1:
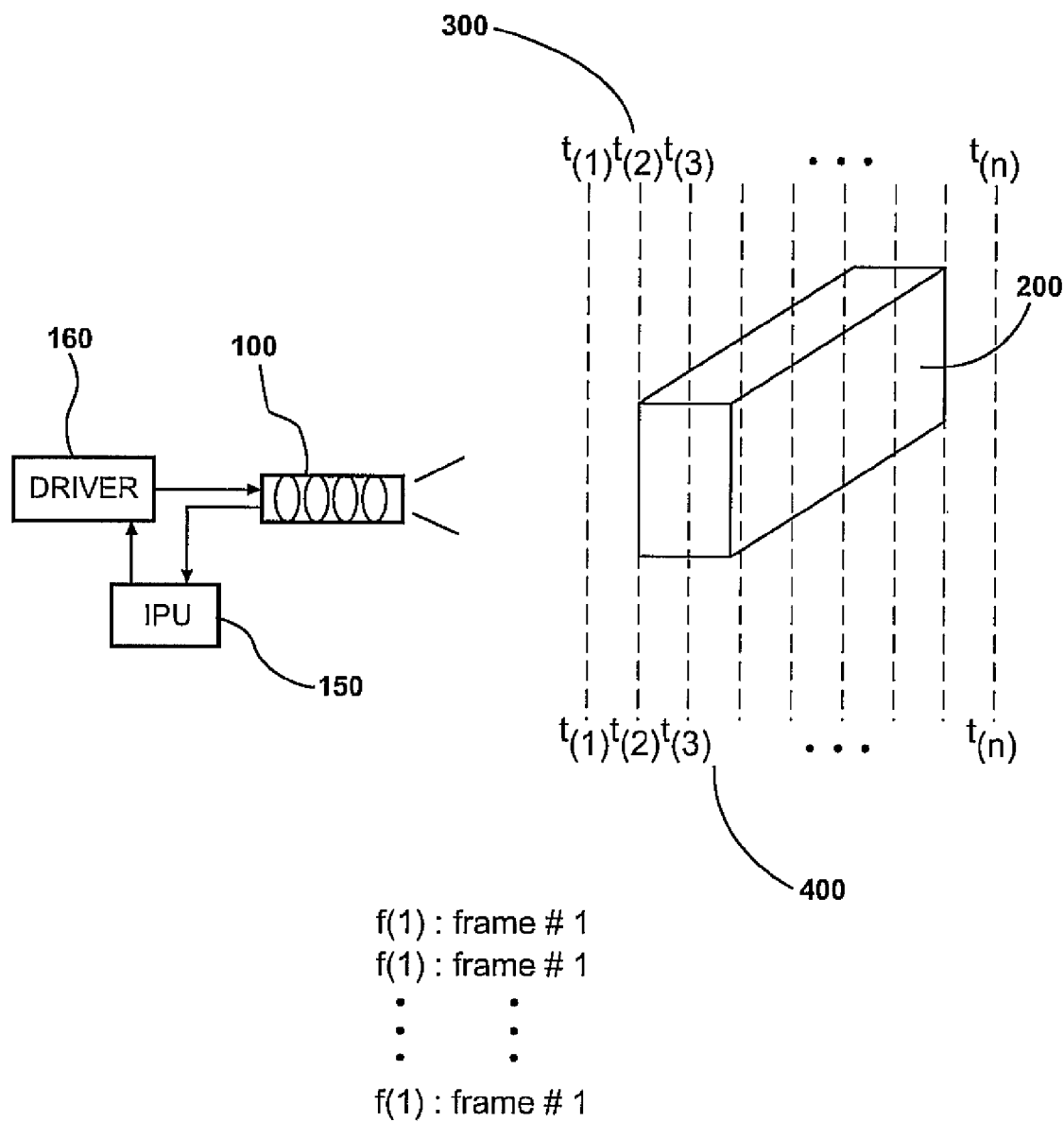
FIG. 1 is a schematic drawing of the camera of the present invention illustrating the manner in which an object to be recorded is effectively sectioned to produce images of closely spaced focal lengths.

In FIG. 1, the image capture device 100 is a lens module with liquid crystal LC lens equipped. The LC lens will capture the clear image or the focused image at different focal lengths with different voltages applied to the LC lens.

Figure 2:
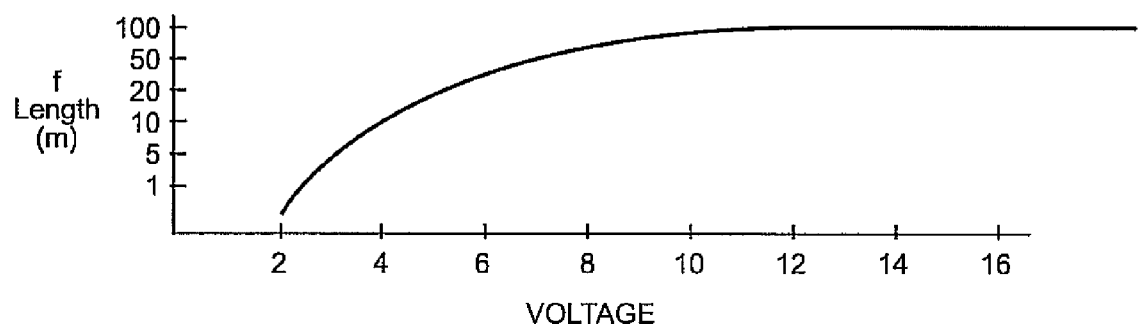
FIG. 2 is a curve of a focal length of the liquid crystal lens as a function of the applied voltage.

Depending on the LC mixture used and the LC lens structure designed, the voltage applied and the focal length achieved could be shown at FIG. 2 as an example.

The LC lens module working with the image sensor (either CCD or CMOS) will create the focused images at different focal distances 400 by applying different voltages at a series of times 300. The distance variation could be in very high resolutions with the very small amount of voltage changes. The focal distance vs. voltage chart could be developed by moving the target at different distance, then adjusting the voltage to get the focused image. This technique could also be reversed by catching the target and focus it, then get the distance reading by sensing the voltage applied. It could be through a conversion from a look-up table, or through the calculation of an algorithm.

This technique will be very useful and at very low cost for measuring the distance of image capture devices.

Whenever the 3D picture is taken, a series of picture frames will be captured. At time 1, t(1), the frame at focal length t(1) is captured; this process will be continued until t(n).

Again, depending on the LC mixture used and the driving technique adopted, the time needed to capture a frame will be in the range of 1 ms to 100 ms. It means in one second time period, 10-1,000 frames of picture will be captured.

Once a frame of image is captured, the data will be sent to 150, IPU—image processing unit. It's a microcomputer based module to handle the necessary image perfection, editing, remarking, storing.

So, after the picture is taken, the IPU will have enough data of the object(s) in front of the camera with FDM attached.

In each camera, there is always a targeted area marked on the viewing window, so the user can cam to the desired target to shoot.

The target will be displayed on the viewing display attached to the lens module or the camera. Once confirmed by the user and the button is pushed, the IPU will start to capture the images based on the object at the center of the viewing window.

If the targeted object is, for example, located 1 m away from the camera, then the camera will sense it, and the IPU will determine the "range" of 3D, then make necessary frame divisions in the allowed time period.

The 3D image FDM frame will have some unique format of construction. Only display systems with the 3D decoding capability will be able to display the 3D images. Otherwise, a normal 2D image will be displayed.

Figure 3:
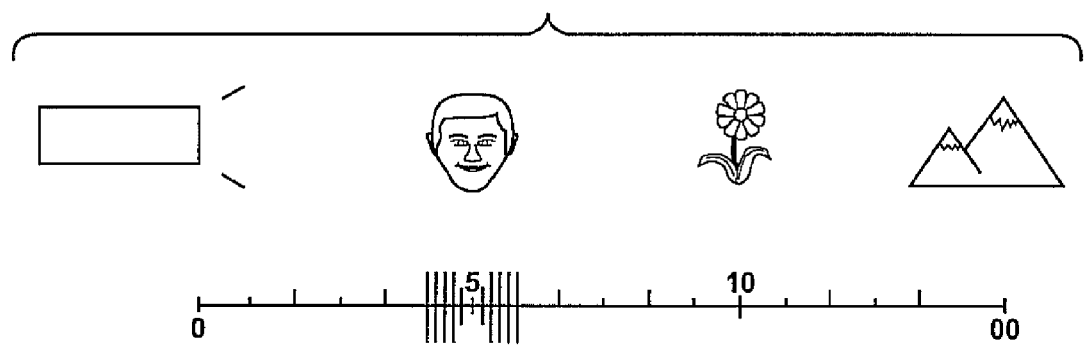
FIG. 3 is a schematic illustration of a mode selection control on the image forming camera that provides icons for a user to choose the approximate focal length such as a human head figure for near distance imaging, a flower diagram for mid-distance imaging and a mountain diagram for distance imaging.

There will be a "mode" selection for user to choose, pretty much like the one in most camera equipped nowadays with a "human head figure" for near distance shooting, a "flower" diagram for mid-distance shooting, and a "mountain" diagram for distance shooting. See FIG. 3.

After this mode is chosen, the IPU 150 will give a command to driver 160 to take image frames from "front to rear" or "rear to front". This will decide which frame will serve as the base frame to form the 3D images. For example, if the picture is shooting a person 5 meters away, then the face details shall be served as the focal center of the image and become the base of the series of frames to be taken. Vice versa, if the scenery of a far distant mountain is the target, then the focal center will be the mountain.

On the human face picture, the frame dividing will be made in more intensive frequency in the near distance focal length. The image capture 100 will be 50% of the number of frames to be around 5 m focal length distance. On other example, if a flower at 10 m is the target, then the most frames of images shall be centered around 10 m focal length.

The adjustment of f(1) to f(n) with corresponding t(1) to t(n) will be calculated by the IPU, and the driver will drive the LC lens to move the focal length back and forth.

On Display Side

Basically a multilayer display substrate will be structured. Each display layer could be in different technology such as TFT-LCD, OLED, FED, plasma, etc., but with pixel addressing capabilities.

The minimum number of display layers will be two. This will create the vision depth of the images and give the 3D effect.

The bottom layer will form the base of the image while the layers on top of it will give the vision depth image to form the 3D effect.

As a result, the layers other than the bottom one shall be in transparent type display, such as LCD; the image displayed on the bottom layer will be seen through by viewers.

Figure 4:
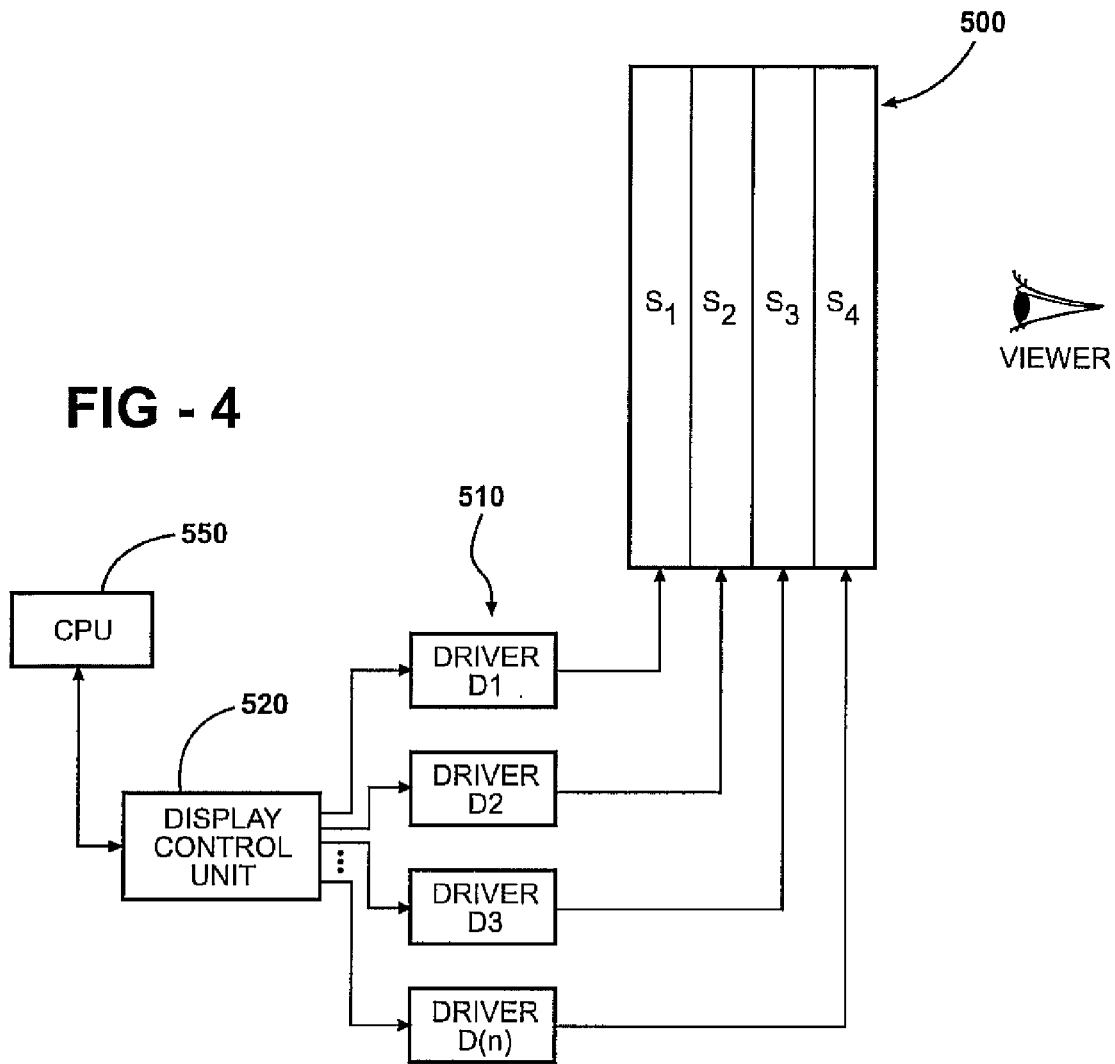
FIG. 4 is a schematic diagram of a multilayer display screen and a computer controlled driving system for the display screen.
Figure 5:
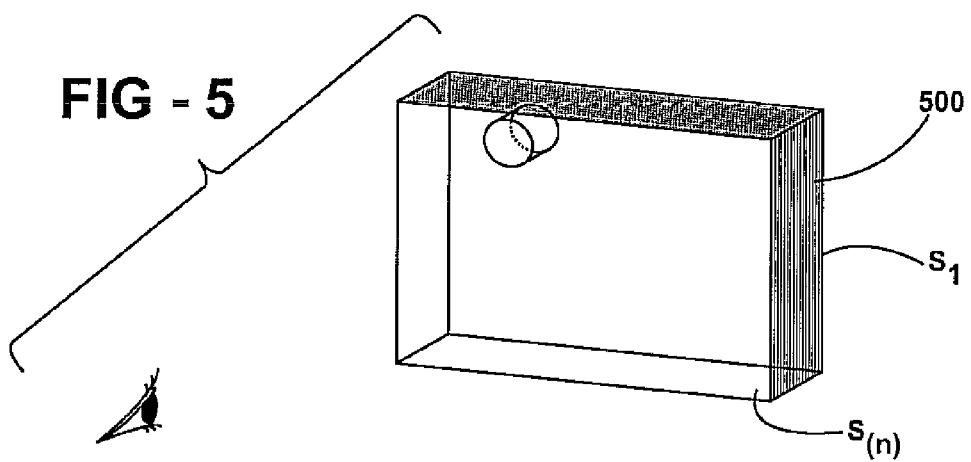
FIG. 5 is a schematic representation of an observer viewing the multilayer display screen and visualizing an object displayed on the screen in three dimensions.

In the display system, like shown in FIG. 4, a multilayer of display substrates $S_1, S_2, \ldots S_n$ is shown. Each substrate will have the same pixel map and construction, and each substrate was driven by an individual driver circuitry, $D_1, D_2, \ldots D_n$.

When the 3D flow in the CPU 550, the frame with "base image" will be detected. This image will be sent to either $D_1$ as the bottom substrate or $D_n$ as the most front substrate.

Once the base frame is settled, the rest of frames will flow into the DCU to determine which frame goes to which driver.

Since the different frame will have the different focus, the image shown on $S_1$ will not be overlapped exactly as Sn; there will be a position shift on the image. This will be represented by pixel shift on display substrate.

The same 2D image with image shift (targeted object), at the same plan but with some depth, will give the 3D visual effect.

The images coming from all frames will be precisely aligned, and going through a mapping algorithm, the far end background (or those with very minor focal distance variation) will be the same for all frames.

The only image difference will be the image shifts caused by different focal distance. The mapping algorithm will eliminate the overlapping of object in those middle frames. So, it won't cause any image blurry problems. Only the portion of image shift (image depth) will be shown.

The high refresh rate of those middle layers with fast frame refresh will offer the seamless 3D image effect.

The more substrate layers constructed, the more vivid of 3D images can be created.

With more powerful computing CPU used, the static image capture will be escalated to moving images, or the 3D video production.

Theory of Composition 3D Images

Figure 6:
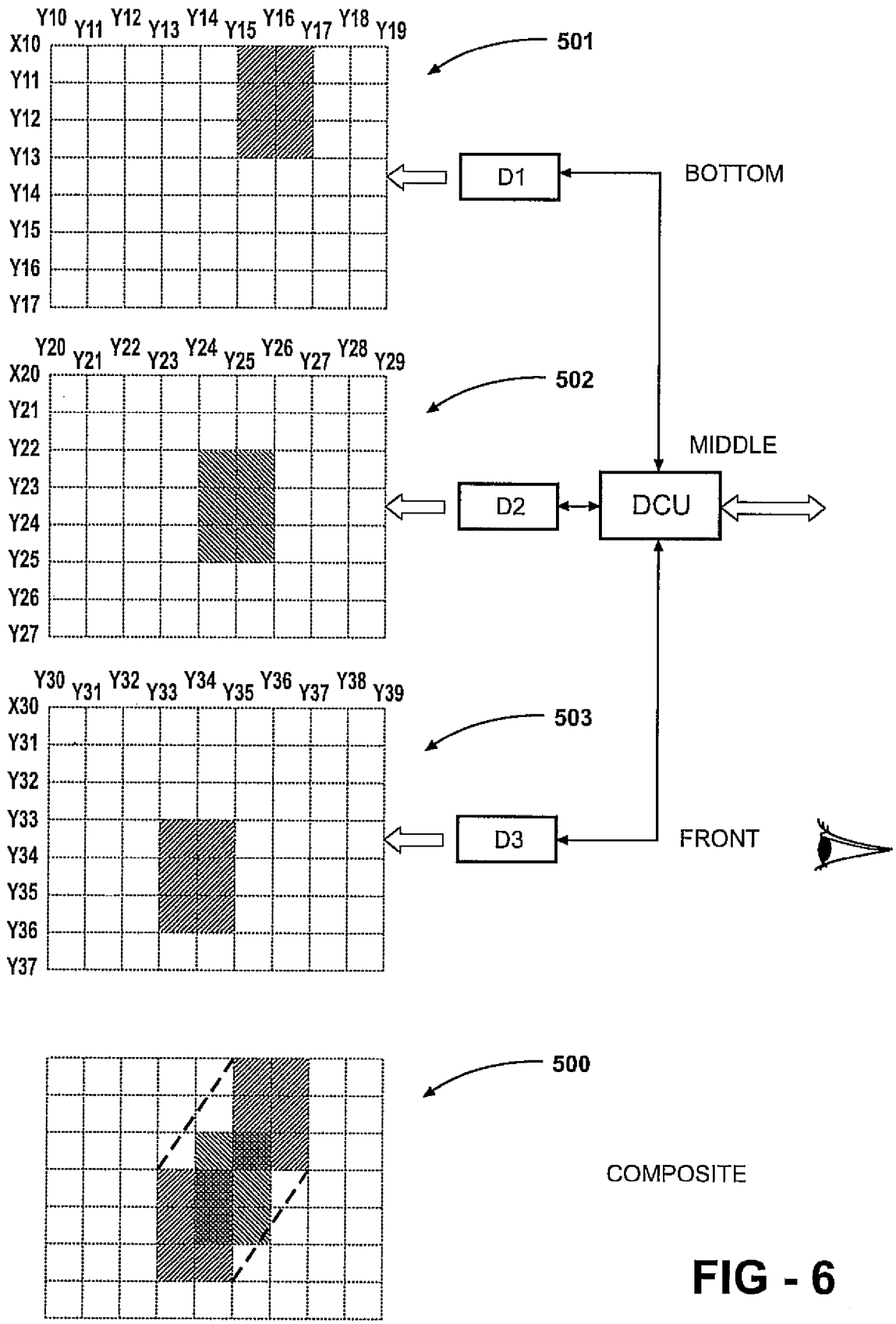
FIG. 6 is a schematic diagram of the control system for a three-layered screen, producing individual images of the object at different focal lengths on each of the screens and a composite object as viewed by an observer of the screen stack.

A simplified description, in FIG. 6.

Three LCD display substrates are used to construct the 3D display. The number of substrates could be any number larger than two, and two is the minimum requirement.

The front substrate is 503, the middle one is 502, and 501 the bottom one.

Once the 3D image data was flowing in DCU, the DCU will reconfigure the data into three groups. The image with focal length corresponding to the nearest distance will be used for D3, the focal length for target distance will be used for D1, and the one in the middle will be for D2.

The picture with focused image in D3 is defined and displayed in 2D format:

$$I_3 \begin{cases} X(33-36) \\ Y(33-35) \end{cases}$$

For D2, it is $I_2 \begin{cases} X(22-25) \\ Y(24-26) \end{cases}$

For D1, it is $I_1 \begin{cases} X(10-13) \\ Y(15-17) \end{cases}$

Since the D3 is the picture that viewer is targeting, the $I_3$ is served as the appearing image, while $I_2$ and $I_1$ are served as supported images to provide the image depth effect.

The DCU will perform the graphic computing to determine the connection of $I_3$, $I_2$ and $I_1$ and with the overlap of the images to create the 3D effect.

When the camera is shooting a far end object, the focal length variation won't be too significant. The 3D effect will be also not too significant.

However, when shooting an object, or targeting an area, in a reasonable distance that the 3D camera will be able to differentiate the focal variation, then the 3D effect can be displaced easily. At this case, the far end background will remain the same, no pixel movement for $I_3$, $I_2$ or $I_1$.

Algorithm of Displaying 3D Images

In order to display a 3D image with different focal depth, a display stack 500 incorporating more than one display substrate is used, as FIG. 4 shows. The layers of the stack, $S_1$, $S_2$, ... $S_n$, are controlled by drivers 510, under a display control unit 520, powered by a CPU 550.

There are many different display technologies available on the market today. However, in order to offer a 3D image with holographic effect, the depth or the volumatic structure is preferred.

The mapping of same images with different focal depth will provide the 3D effect, When those different focal depth images are displayed at different substrates and created the volumatic effect, the 3D will become even more 3D.

Then, those images with different focal depth mapped with the same pixel coordinates will present the 3D effect.

This invention is using the time division multiplexing techniques to display the images from the far distance to the near distance, the image pixel position changes caused by different focal depth will give the visual impact as the 3D image.

Figure 7:
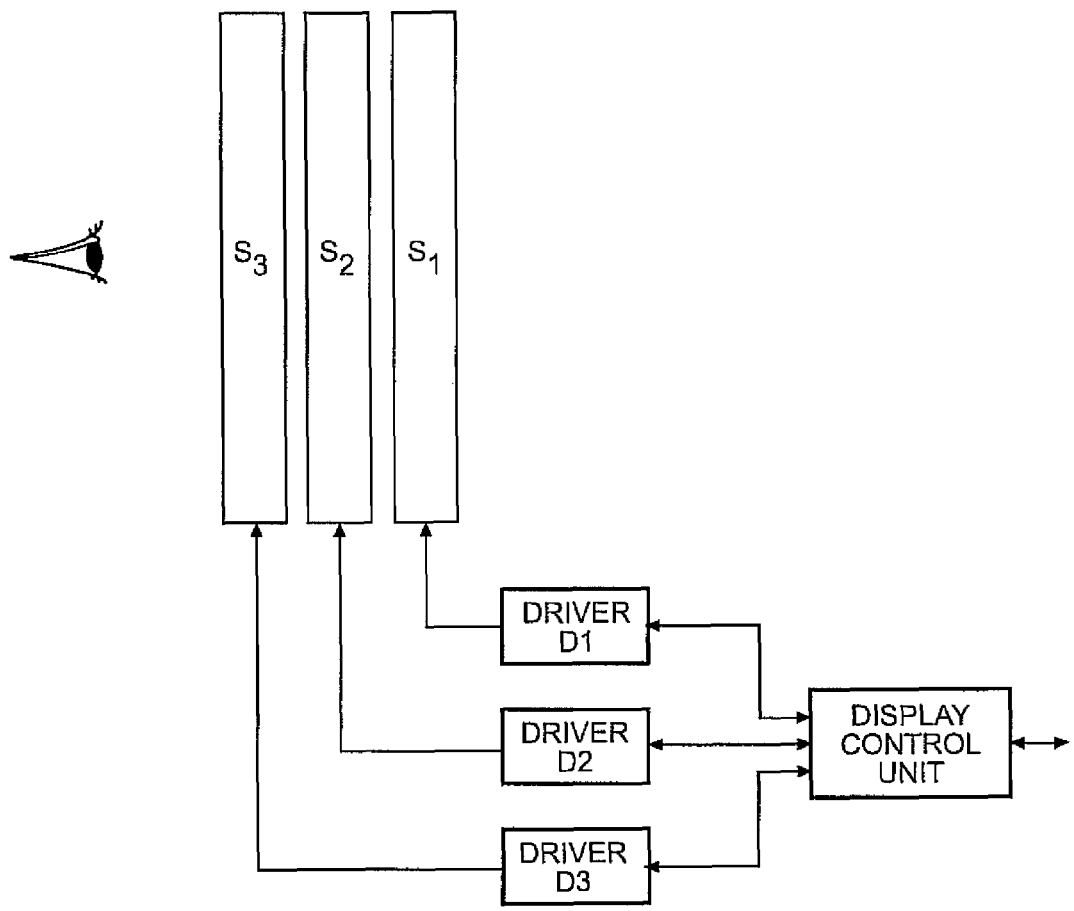
FIG. 7 is a schematic diagram of an observer viewing a three layered display screen with a time reference for each of the layers.
Figure 7:
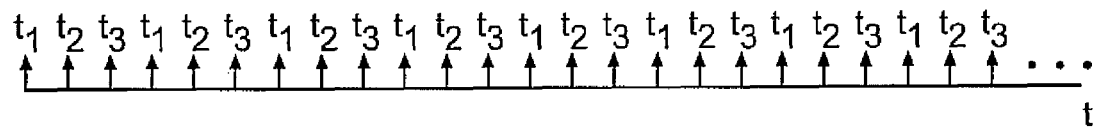
Figure 8A:
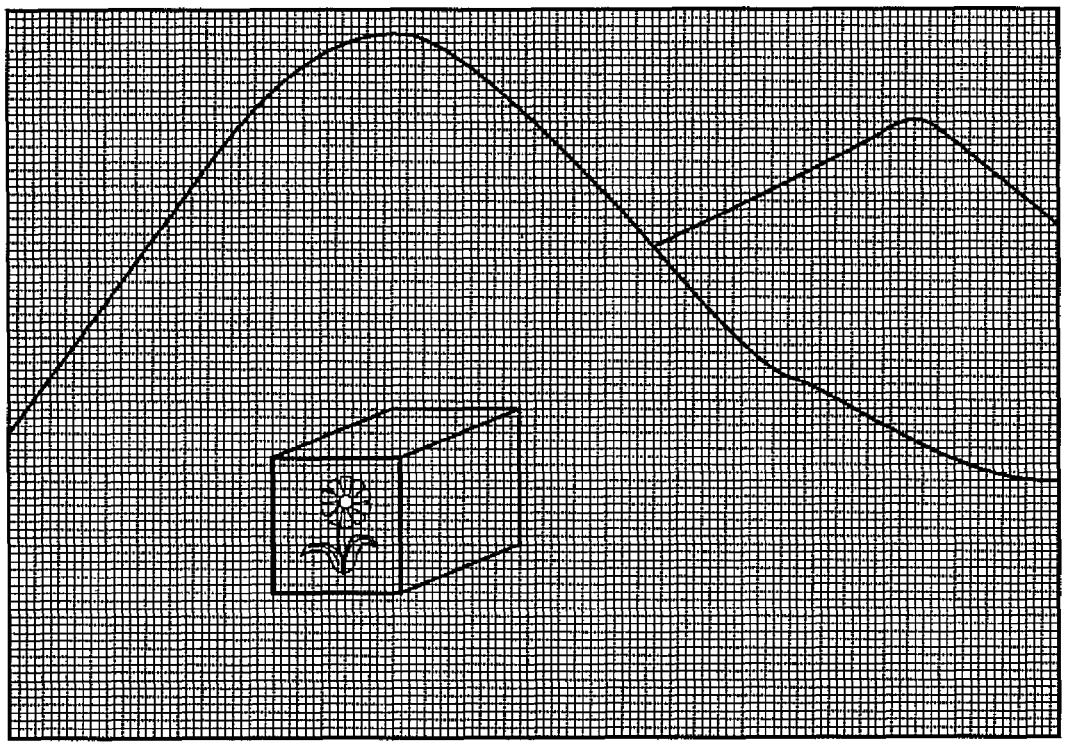
FIGS. 8A-8F are perspective views of the image of a rectangular cube in the foreground, with hills in the background, illustrating six successive layers through the cube which might be recorded by a camera formed in accordance with the present invention and displayed on a six layer display screen to produce a three-dimensional image of the object.
Figure 8B:
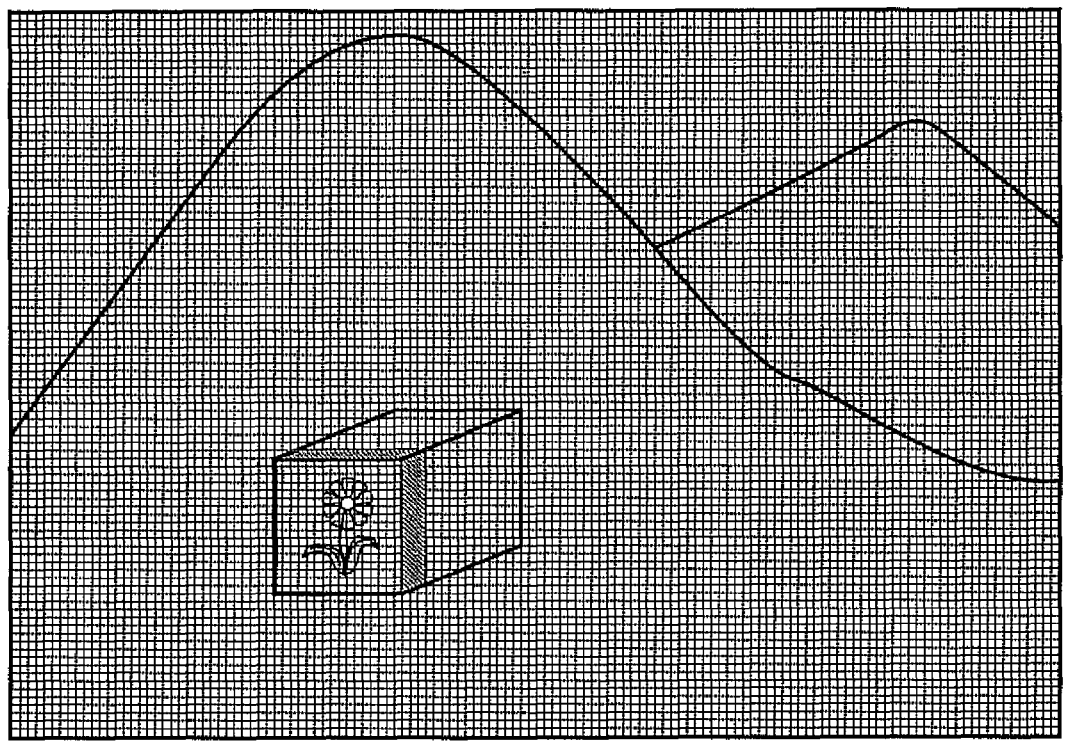
Figure 8C:
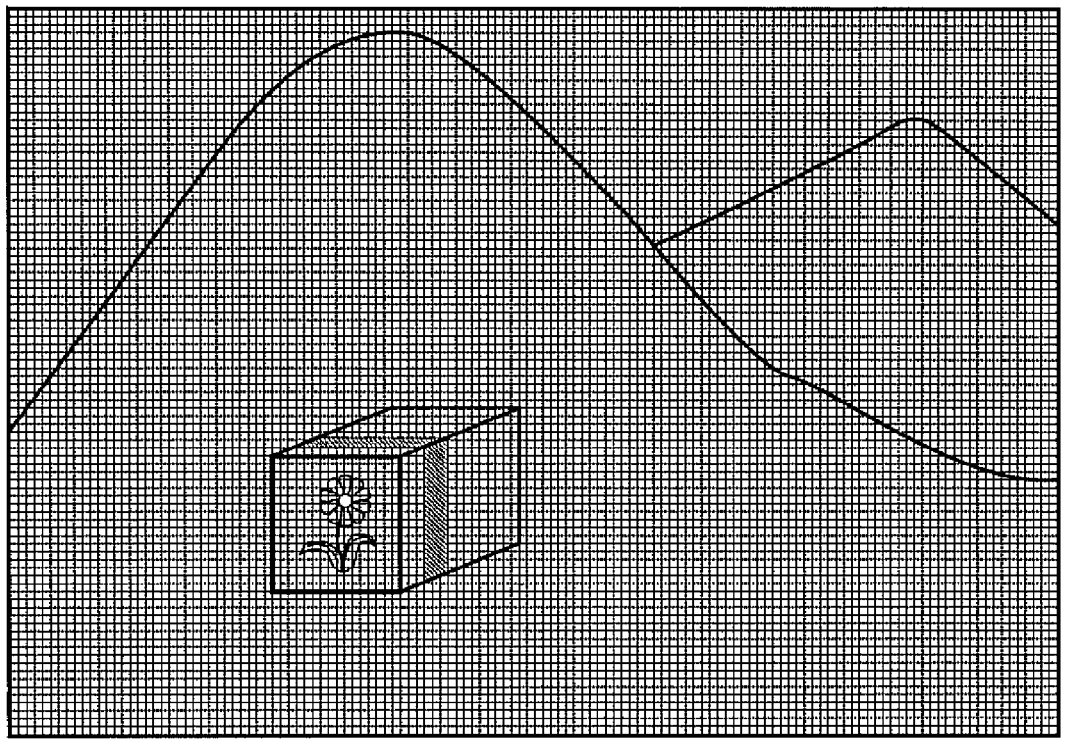
Figure 8D:
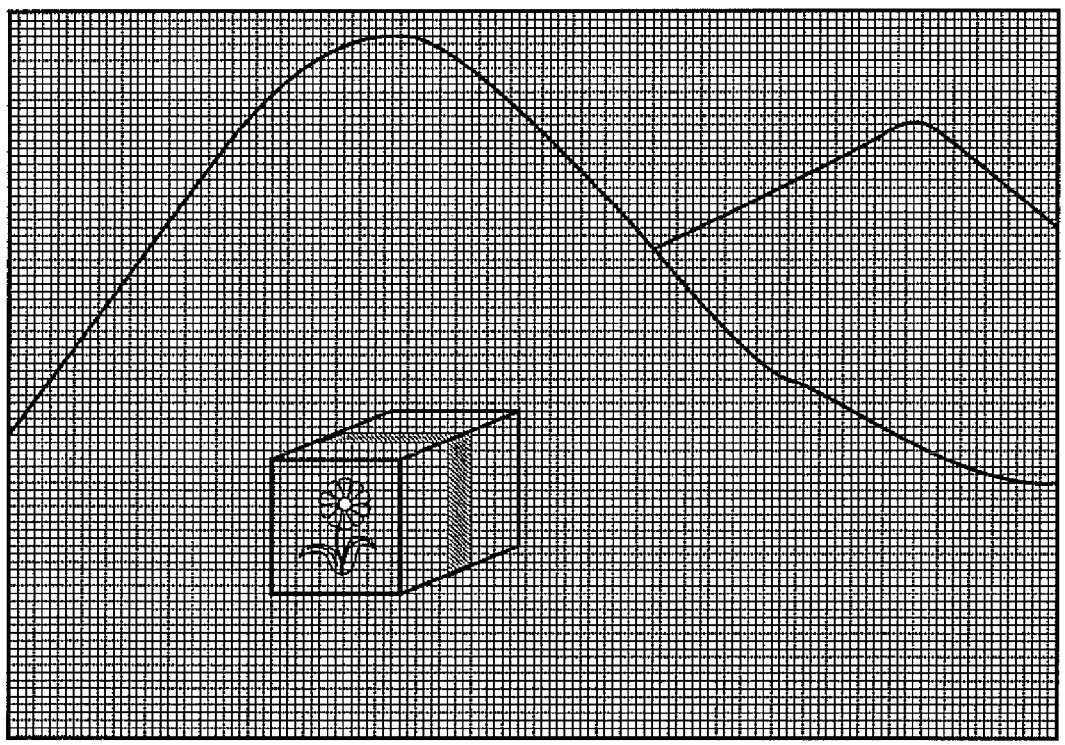
Figure 8E:
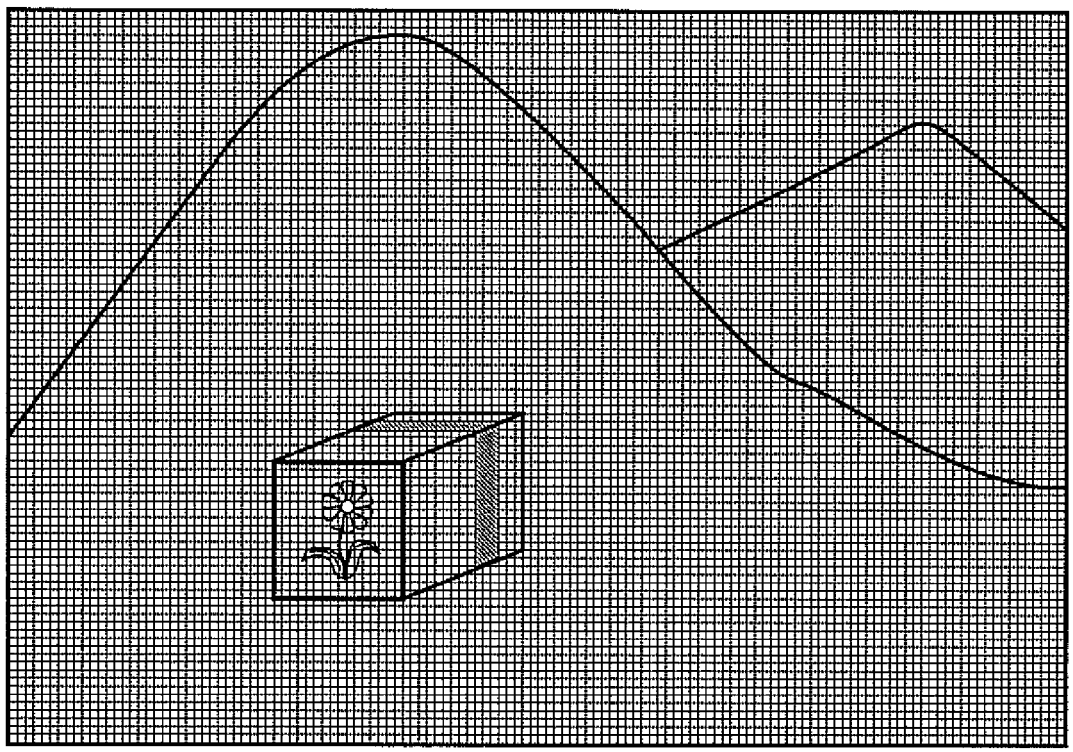
Figure 8F:
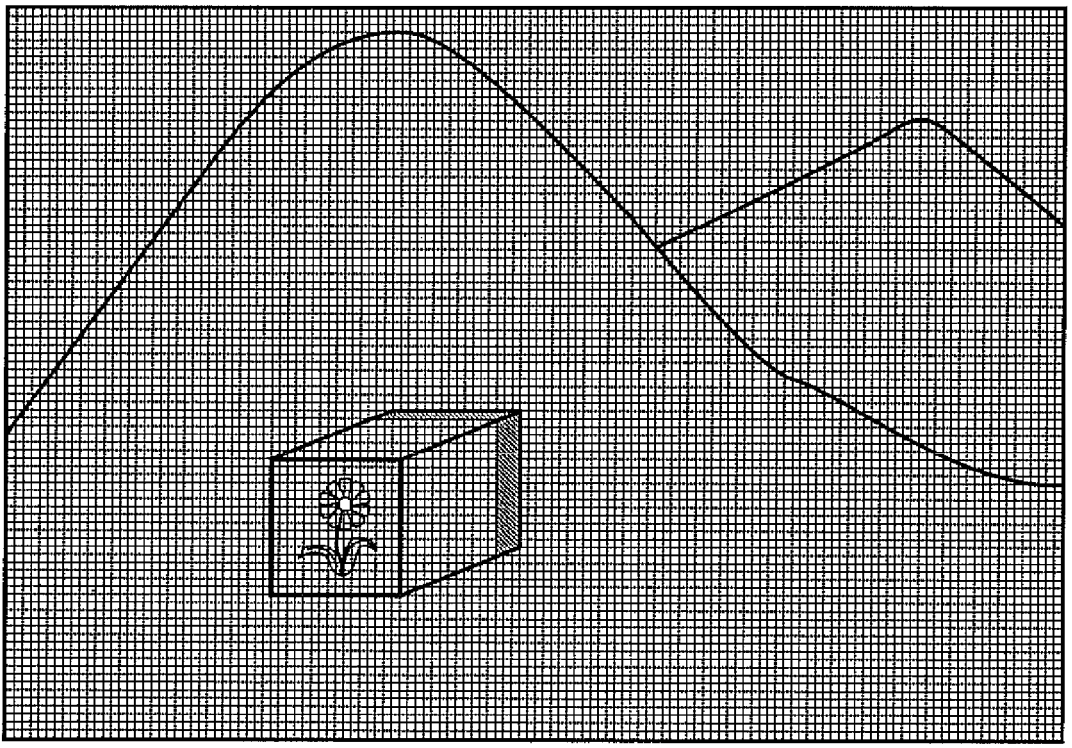

For example, in FIG. 7, three display substrates are mapped together. If the LCD (TFT-LCD) display substrates are used, then the frame rate of each individual substrate is about 60 fps or 16 ms per frame of image.

Then the display sequence controlled by DCU could be $$t_1 \rightarrow f(n)$$
$$t_2 \rightarrow f(n-1)$$
$$t_3 \rightarrow f(1)$$
$$t_1 \rightarrow f(n)$$
$$t_2 \rightarrow f(n-2)$$
$$t_3 \rightarrow f(1)$$
$$t_1 \rightarrow f(n)$$
$$t_2 \rightarrow f(n-3)$$
$$t_3 \rightarrow f(1)$$
$$\vdots$$

If there are 100 focal depth images captured, going through one cycle will take 1,600 ms or 1.6 sec. In order to get faster and smooth image moving effect, higher fps is desired, and less focal depth image frame will be used.

In the TFT-LCD display substrates, the composite display will share the same back light, and all substrates will be aligned with same pixel coordinates.

FIGS. 8A-8F illustrate images of a rectangular cube disposed in front of background hills. The camera is focused on the cube and a series of images are rapidly recorded representing focal lengths at cross sections through the depth of the cube. The different focal lengths are achieved by controlling the voltage on the liquid crystal lens 100 in accordance with FIG. 1. The images progress from the front to the rear of the cube. When the images are displayed on a display screen formed in accordance with the invention having at least six layers, with the shortest focal length imaged on the front layer and the longest focal length on the rear, the image will reproduce the cube in three dimensions with a true depth effect.

We claim:

1. A system for recording and displaying images of a three-dimensional object so as to produce a realistic three-dimensional image, comprising:
    a digital camera having a liquid crystal, electrically controlled, variable focal lens;
    a computer-controlled system for recording a sequence of images with the camera, at differing focal lengths through the depth of an imaged object, by varying the voltage on the lens; and
    a display module comprising a stack of display substrates of transmissive type and pixel-selective technology, and generating a display employing one image at each of the focal lengths displayed on each of the display layers, with the shortest focal length on the layer closest to the observer.

2. A method of recording a sequence of images of an object at various depths in the object, for use in a three-dimensional display, comprising:
    a camera having a liquid crystal electrically tunable focal length lens; and
    a microprocessor based control system for varying the voltage on the lens to produce a sequence of images of the object at differing focal lengths through the depth of the object, in a fraction of a second.

3. A system for displaying a three-dimensional image of an object utilizing a plurality of images of the object of varying focal length, taken in a short period of time, comprising:
    a multilayer stack of transmissive type displays which are pixel addressable; and
    control means for displaying each of said digital images on one of the layers of
    a multilayer display apparatus while the images that are respectively focused at a plurality of focal lengths are stacked in distance order and above one another, and displaying the focused images by taking the nearest focused image as reference and by having the image pixels aligned, with the display sequences of the focused images being arranged by using time-division multiplexing, so as to produce a three-dimensional image of the object.

4. The system of claim 3 including a backlight associated with the rearmost display panel of the multilayer display apparatus.

5. The system of claim 3 wherein each displayer layer in the multilayer display apparatus is chosen from the group consisting of TFT-LCD, OLED, FED and plasma.

6. A system for displaying a three-dimensional image of an object utilizing a plurality of images of the object of varying focal length, taken in a short period of time, comprising:
- a transmissive type display which is pixel addressable; and
- control means for displaying each of said digital images on the transmissive type display while the display sequence of the images that are respectively focused at a plurality of focal lengths are arranged by using time-division multiplexing in near-to-far/far-to-near distance order, and displaying the focused images by taking the nearest focused image as reference and by having the image pixels aligned, so as to produce a three-dimensional image of the object.

* * * * *

UNITED STATES PATENT AND TRADEMARK OFFICE
CERTIFICATE OF CORRECTION

Page 1 of 1

PATENT NO. : 8,100,539 B2
APPLICATION NO. : 12/100491
DATED : January 24, 2012
INVENTOR(S) : Ling-Yuan Tseng et al.

It is certified that error appears in the above-identified patent and that said Letters Patent is hereby corrected as shown below:

In the front page, the figure, "f(1) : frame #1", "f(1) : frame #1",..., "f(1) : frame #1" at the bottom should read -- t(1) : frame #1 --, -- t(2) : frame #2 --, ..., -- t(n) : frame #n --, respectively;

In the drawings, Sheet 1, FIG. 1, "f(1) : frame #1", "f(1) : frame #1", ..., "f(1) : frame #1" at the bottom should read -- t(1) : frame #1 --, -- t(2) : frame #2 --, ..., -- t(n) : frame #n --, respectively;

Signed and Sealed this
Twenty-ninth Day of May, 2012

David J. Kappos
*Director of the United States Patent and Trademark Office*